INVENTOR.
THOMAS J. FOSTER
BY
Blair, Curtis + Hayward
ATTORNEYS

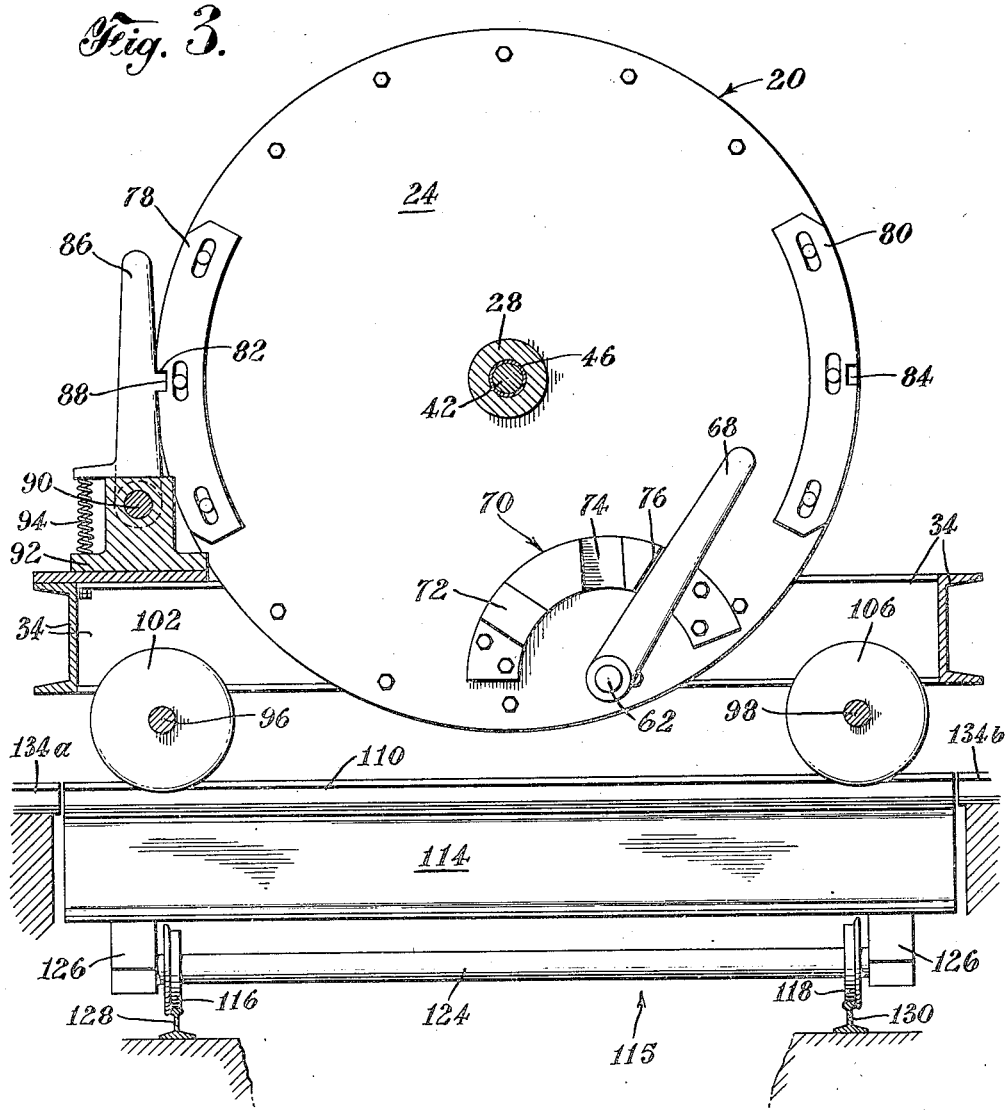

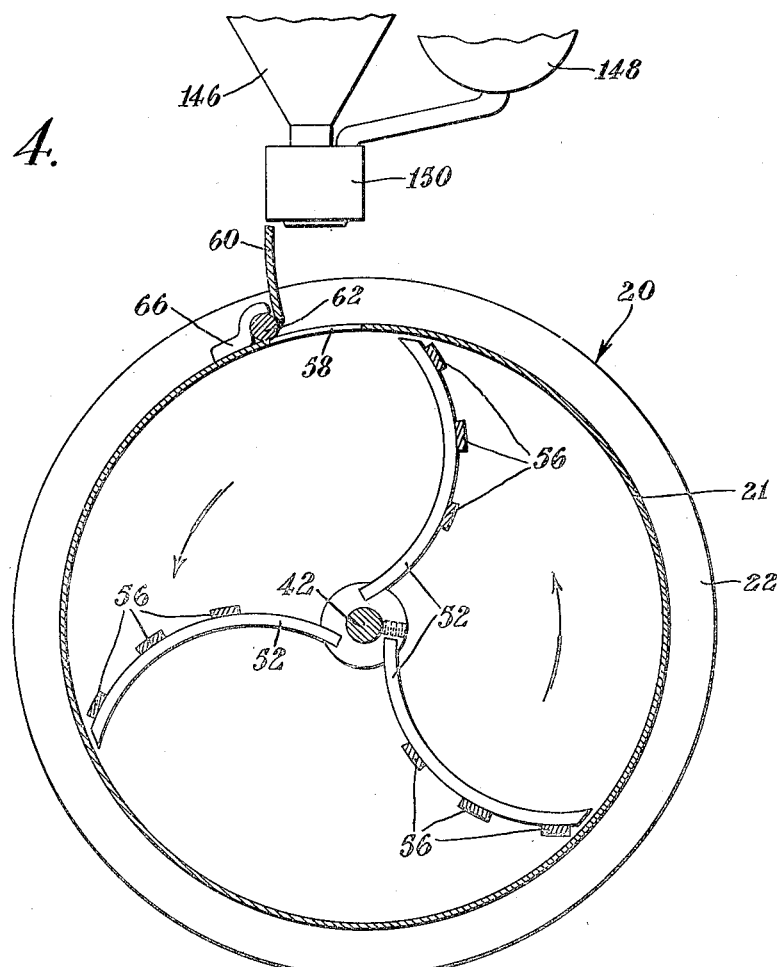
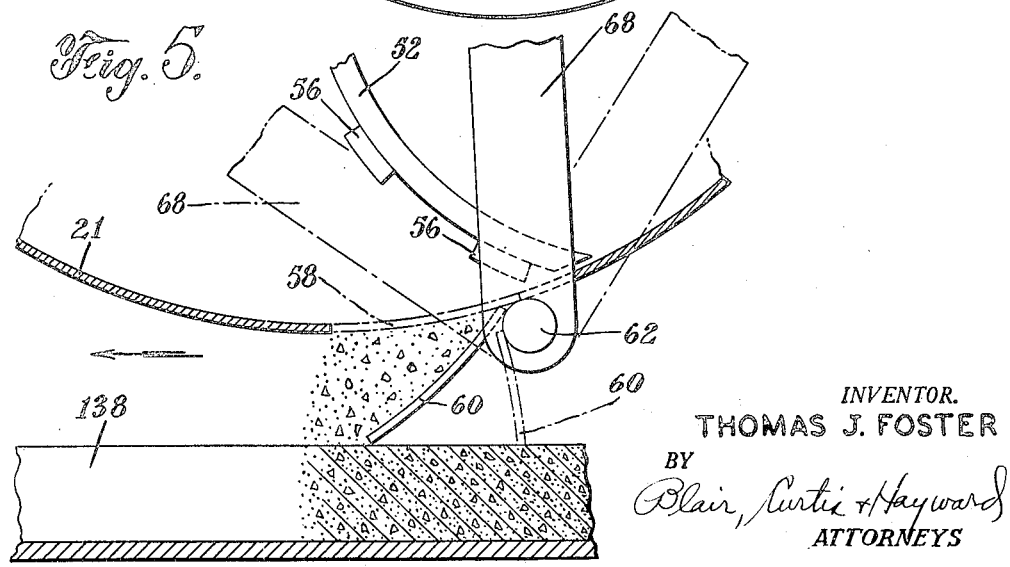

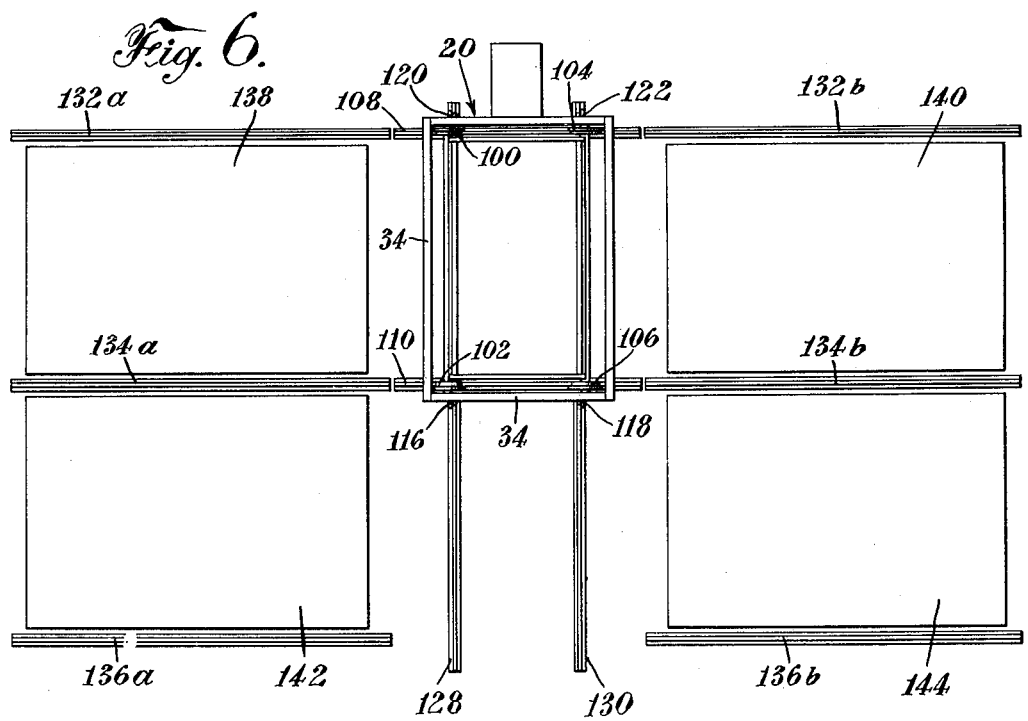

Patented Feb. 21, 1950

2,498,363

UNITED STATES PATENT OFFICE 2,498,363

APPARATUS FOR MIXING AND POURING A QUICK-SETTING MATERIAL

Thomas J. Foster, Ridgewood, N. J.

Application May 11, 1946, Serial No. 669,081

3 Claims. (Cl. 259—9)

This invention relates to means for preparing precast wall, floor or ceiling panels, etc., useful in the erection of buildings. One example of such panels is described and claimed in my Patent No. 2,305,684. Such panels advantageously are made from quick setting plaster or cementitious material such as gypsum containing vermiculite. Heretofore the component panel materials have been mixed by hand or by more or less conventional mixing equipment necessitating hand operations. I have discovered a novel combination of instrumentalities and operations whereby an automatic mixer may be used not only as a means for mixing quick setting batches of material but also for pouring the soft mixture directly into the panel molding frames in which the material is to harden and for screeding it into final position.

It is an object of my invention to provide apparatus such as exemplified herein having to a notable extent the characteristics and capabilities set forth. An additional object is the provision of a mixing and pouring apparatus having particular utility in the manufacturing of precast building panels. A further object resides in the provision of a combination of mixing and pouring apparatuses and operations whereby a full-size precast panel may be poured with a minimum of hand operations. A still further object resides in the provision of an improved apparatus for manufacturing building panels which overcomes certain well-known disadvantages inherent in the apparatuses of the prior art. Other objects will be in part pointed out as the description proceeds and will in part become apparent therefrom.

The invention accordingly consists in the features of construction, combinations of elements, arrangements of parts and methods of operations as will be exemplified in the structures and sequences and series of steps to be hereinafter indicated and the scope of the application of which will be set forth in the claims.

In this specification and the accompanying drawings I have shown and described a preferred embodiment of my invention; it is to be understood that this is not intended to be exhaustive nor limiting of the invention but on the contrary is given for purposes of illustration in order that others skilled in the art may fully understand the invention and the principles thereof and the manner of applying it in practical use so that they may modify and adapt it in various forms, each as may be best suited to the conditions of a particular use.

In the drawings:

Figure 3 is a view taken along line 3—3 of Figure 1;

Figure 4 is a view taken along line 4—4 of Figure 1;

Figure 5 is a fragmentary sectional view on an enlarged scale of some of the parts appearing in Figure 4 showing them at a different stage of the process; and, Figure 6 is a schematic representation of apparatus embodying the invention and adapted for use with four panel moulding frames.

Figure 1:
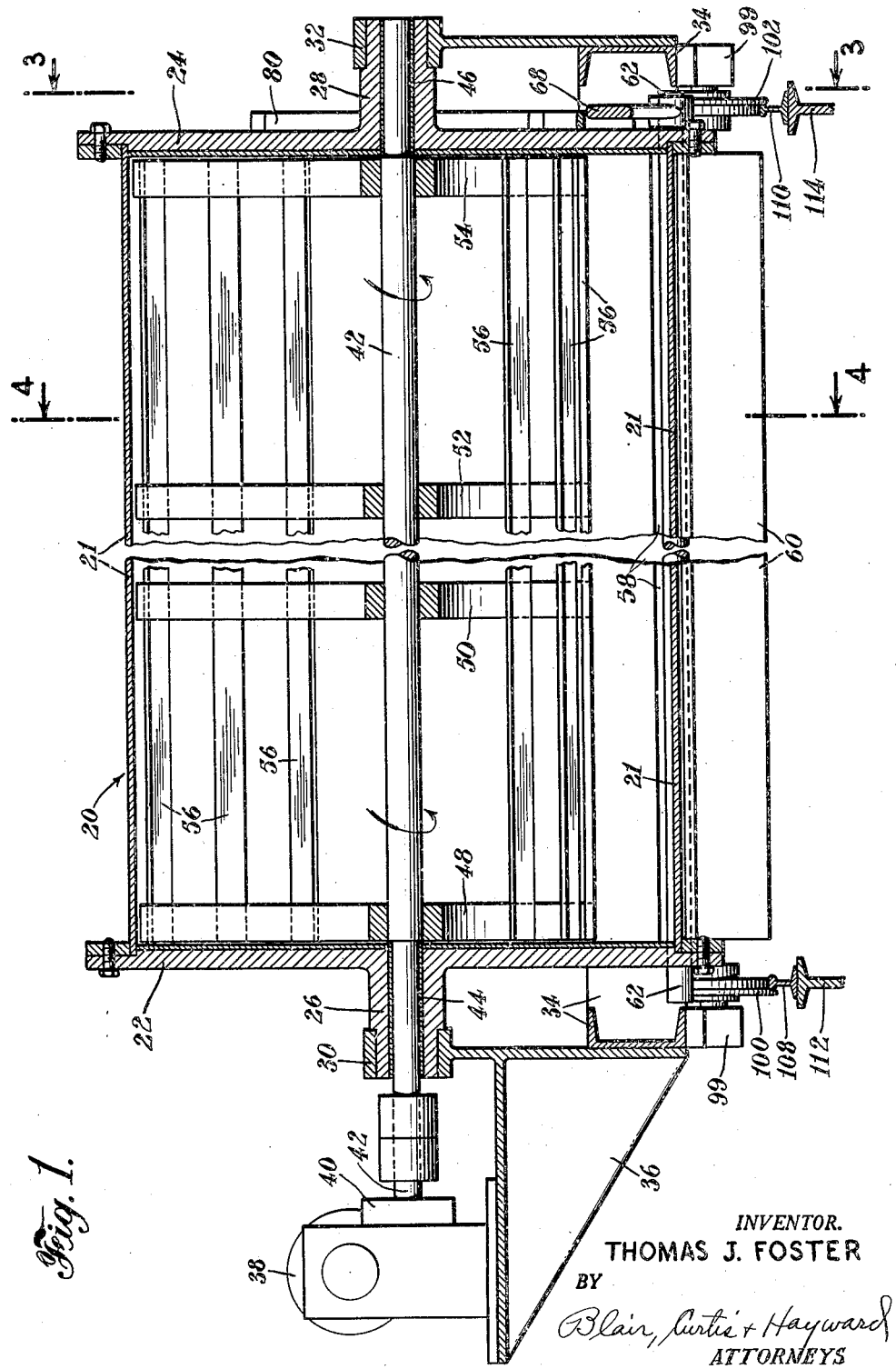
Figure 1 is a side elevation, partly in section and with parts broken away, of a mixing and pouring apparatus embodying my invention.

In Figure 1 a drum is generally indicated at 20. It includes a shell-like sheet metal cylinder 21 and a pair of opposing, structurally strong, end plates 22 and 24. Plate 22 is provided with a central hub 26 and plate 24 is provided with a central hub 28. The hubs are fitted into and supported by a pair of trunnions 30 and 32 which, in turn, are supported by a frame 34 (see also Figures 2 and 3). As shown in Figure 1 the frame includes a motor bracket 36 supporting a reversible motor 38 connected to a reducing gear 40 and driving a shaft 42. Shaft 42 extends through the drum and is freely rotatable therein within bearings 44 and 46 mounted in the hubs. The shaft carries four spiders 48, 50, 52 and 54 (see Figures 1 and 4) within the drum and each spider is locked to the shaft so as to be rotated by motor 38. Figure 4 shows that the legs of each spider are arcuate. Each leg supports three stirring blades 56 which extend longitudinally through the drum parallel to shaft 42. Thus when shaft 42 is driven by motor 38 to move the stirring blades in the direction of the arrows the mixture is moved toward the center of the drum.

The cylinder 21 of the drum includes a rectangular opening 58 (see Figures 1 and 4) which extends across the drum from one end plate to the other. When the opening is positioned at the uppermost part of the drum (see Figure 4) it serves as an inlet through which material to be mixed may be passed, and when the drum is rotated in the trunnions through 180° (see Figure 5), as will be described hereinafter, the opening serves as an outlet through which mixed cementitious material may be poured. So long as the opening is at the top of the drum no leakage of liquid from the drum can occur.

Figure 2:
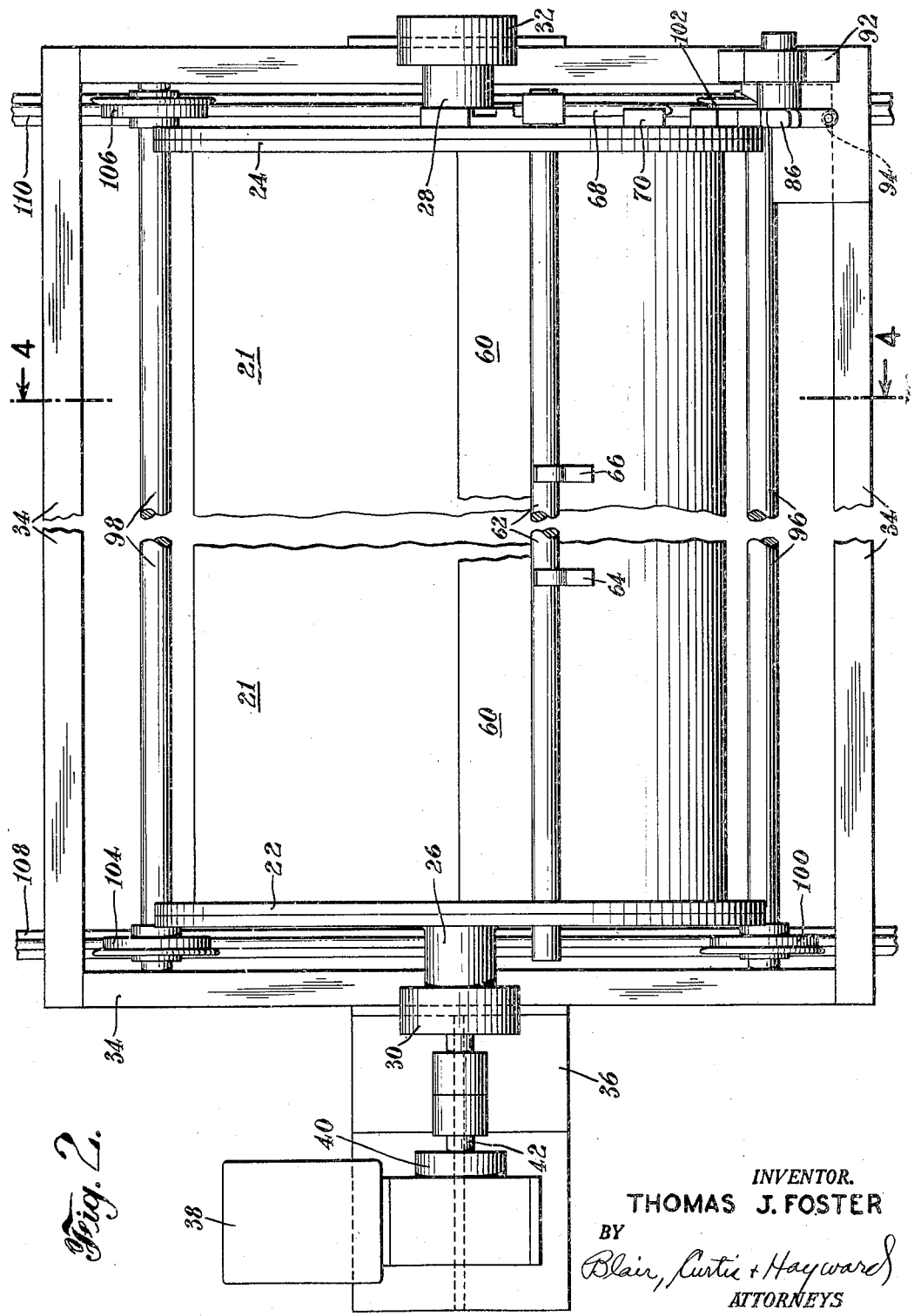
Figure 2 is a plan view of the apparatus illustrated in Figure 1, certain parts being broken away.

Opening 58 is fitted with a door 60 (see Figures 2 and 4). This door is welded along one edge to a door rod 62 supported at each end in end plates 22 and 24. Intermediate door rod supports are indicated (see Figure 2) at 64 and 66. Rod 62 carries upon one end a door lever 68. As shown in Figure 3, end plate 24 includes an arcuate door stop member 70 provided with stop portions 72, 74 and 76. Door lever 68 is sufficiently resilient that it may be sprung outwardly so as to clear the projecting portions of stop member 70 and thus be moved into any one of the three stops shown. When door lever 68 is positioned in stop 76, as shown in Figure 3, the door completely closes opening 58. When the lever is in stop 74 door 60 assumes the position shown in solid lines in Figure 5 and is locked partly open for screeding purposes, as will be described hereinafter. When lever 68 is positioned in stop 72 the door is locked in the wide-open position shown in Figure 4.

In Figure 3 a pair of arcuate cylinder stops 78 and 80 are shown. These are located on diametrically opposed rim portions of end plate 24. Arcuate piece 78 is provided with a stop 82 and arcuate piece 80 is provided with a stop 84. A cylinder lock lever 86 carrying a detent 88 serves to lock the cylinder against rotation within trunnions 30 and 32. When detent 88 is interfitted with stop 82, the drum is locked with opening 58 facing the bottom of the apparatus; when detent 88 is locked in stop 84, the drum is locked with opening 58 at the top of the apparatus.

Lever 86 is carried upon a pivot 90 in a support 92 (see Figures 2 and 3) and it is biased by a compression spring 94 which tends to urge the detent toward locked position. When lever 86 is pivoted away from the drum, the drum may be freely turned, by hand in the present embodiment, in trunnions 30 and 32.

With the construction described the various materials to be mixed may be loaded into the cylinder when the cylinder is positioned as shown in Figure 4. Door 60 may then be closed and the stirring blades may then be rotated, advantageously in the direction shown by the arrows in Figure 4, by means of motor 38. When the mixing is complete the drum may be unlocked and rotated to bring the door and opening to the lowermost point, as shown in Figure 5, and the cylinder may then be locked against further rotation. The door can be swung open and the mixed contents allowed to pour out. During the pouring the motor may advantageously be run in reverse so as to promote an even flow of mixed material through opening 58.

In order to pour the mixed cementitious material directly into a panel frame I have mounted the mixing apparatus upon a novel carriage and subcarriage combination whereby the mixing apparatus may be pushed, manually in the present embodiment, from one frame to another and can be used to aid in pouring the mixture into the molds.

Frame 34 is mounted upon a pair of axles 96 and 98 set in bearings 99 provided on the under surfaces of the frame. These axles carry wheels 100, 102, 104 and 106 (see Figure 2) which roll upon rails 108 and 110. Rail 108 is supported by a girder 112 and rail 110 is supported by a girder 114. These girders, together with cross-members not shown, form a subcarriage 115 (see Figure 3) for carrying rails 108 and 110 and all that they support. The girders roll upon wheels 116, 118, 120 and 122 (see Figure 6). Wheels 116 and 118 are mounted upon an axle 124 which appears in Figure 3. This axle is set in supports 126 carried on the lower portions of girder 114. These last-mentioned wheels roll upon rails 128 and 130.

As shown in Figure 6 rails 128 and 130 extend in a direction parallel to the axis of rotation of drum 20; rails 108 and 110 extend in a direction perpendicular to the axis of rotation of drum 20. Rails 108 and 110 may be rolled upon subcarriage 115 along rails 128 and 130 until they are brought into alignment with a pair of rails 132a and 134a on one side of the drum, and 132b and 134b on the other side of the drum. Rail 108 fits between the two rail pieces 132a and 132b and rail 110 fits between the two rail pieces 134a and 134b. When the subcarriage is located in the position illustrated in Figure 6, drum 20 may be moved off of rails 108 and 110 to the left onto rails 132a and 134a or to the right onto rails 132b and 134b. Also, by moving the subcarriage, rail 108 may be placed between rail 134a and rail 134b and rail 110 may be placed between rail 136a and rail 136b so that the entire drum apparatus may be rolled either onto rails 134a and 136a or onto rails 134b and 136b. In the illustrative embodiment four panel frames 138, 140, 142 and 144 are shown arranged between the various stationary rail pieces. Thus the drum may be rolled over and across any one of the four frames to pour mixed panel material into a selected frame.

Figure 5 illustrates the drum with opening 58 toward the bottom and with door 60 locked partially open in a position such that it just clears the upper edge of frame 138. Thus, as the mixing blades rotate in a clockwise direction, the cementitious material is forced downwardly and out of door 60 and, as the drum moves in the direction of the arrows (see Figure 5), the partially opened door 60 acts as a screed which effectively spreads the soft cementitious material level in the panel frame. In this manner a panel frame may be quickly and accurately poured with a quick setting mixed material. It is to be observed that the process described and claimed in my Patent No. 2,305,684, above-mentioned, may be carried out along with my present invention.

After a panel has been poured the drum may be moved back to the central position illustrated in Figure 6 and the interior of the cylinder may readily be washed down. The drum may then be rotated through 180° to the position illustrated in Figure 4 and thereafter, by means of a hopper indicated at 146 and a water supply indicated at 148 operating through a funnel indicated at 150, the drum may be recharged with the components necessary for another batch of quick setting material. The motor should be allowed to drive the stirring blades for a sufficient period to mix the batch and the pouring process may then be repeated for another empty panel frame. Mixing can take place while the drum is being positioned for pouring the next panel. By the time a fourth panel has been poured the first panel probably can be removed and replaced with a fifth empty frame. I have found that with the apparatus described satisfactory mixing is accomplished with a mixing period having a duration of about 30 or 40 seconds when the mixing blades rotate with a speed of about 40 revolutions per minute.

From the foregoing it will be observed that mixing and pouring equipment embodying my invention are well adapted to attain the ends and objects hereinbefore set forth and to be economically manufactured, since the separate features are well suited to common production methods and are subject to a variety of modifications as may be desirable in adapting the invention to different applications.

Since many embodiments of the invention are possible and since many changes might be made in the embodiments set forth, protection is not to be limited to anything described or presented in the above specification and drawings but only to the scope of the hereinafter attached claims.

I claim:

1. In apparatus of the character described, the combination including: a drum, trunnion means supporting said drum for rotation about a horizontal axis, carriage means supporting said trunnion means and adapted to move said trunnion means and said drum along a generally horizontal path perpendicular to the axis about which said drum is rotatable, independently operable mixing means mounted within said drum, means for locking said drum against rotation, opening means extending across said drum, and screeding means cooperating with the opening means to screed mixed material from the drum.

2. Apparatus for mixing and pouring at a predetermined thickness a quick setting material including: a mixing and pouring drum, trunnions supporting the drum for rotation, carriage structure supporting the trunnions and adapted to move the trunnions and drum along a predetermined path, a loading and pouring opening extending across the drum, drum locking mechanism, independent of the carriage structure, for holding the drum against rotation in a loading position or a pouring position, a door disposed across the drum and adapted to assume a position closing off the opening, and an independently operable door locking mechanism for holding the door in a pouring position during pouring to secure a predetermined thickness of the mixture.

3. The invention of claim 2 wherein the carriage structure is disposed upon a carriage substructure and is movable as a whole by the substructure along a second predetermined path.

THOMAS J. FOSTER.

REFERENCES CITED

The following references are of record in the file of this patent:

UNITED STATES PATENTS

| Number | Name | Date |
|---|---|---|
| 1,018,634 | Seaver et al. | Feb. 27, 1912 |
| 1,453,323 | Palmeter | May 1, 1923 |
| 1,483,048 | Sturtevant | Feb. 5, 1924 |
| 1,845,367 | Totman | Feb. 16, 1932 |
| 2,201,748 | Thomason | May 21, 1940 |
| 2,213,243 | Facer | Sept. 3, 1940 |